US006592788B1

(12) United States Patent
Yamamoto et al.

(10) Patent No.: US 6,592,788 B1
(45) Date of Patent: Jul. 15, 2003

(54) METHOD OF MANUFACTURING A DIELECTRIC LENS FOR AN ANTENNA

(75) Inventors: Keizo Yamamoto, Nagaokakyo (JP); Hiroshi Nonogaki, Nagaokakyo (JP); Tatsuhiro Nakamura, Nagaokakyo (JP); Yoshitaka Tanino, Nagaokakyo (JP)

(73) Assignee: Murata Manufacturing Co., Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1045 days.

(21) Appl. No.: 08/691,791

(22) Filed: Aug. 2, 1996

Related U.S. Application Data

(62) Division of application No. 08/268,221, filed on Jun. 29, 1994, now abandoned.

(30) Foreign Application Priority Data

Jun. 30, 1993 (JP) .......................................... 5-161008
Jul. 14, 1993 (JP) .......................................... 5-174016

(51) Int. Cl.[7] .......................................... B29C 44/06
(52) U.S. Cl. .......................... 264/45.5; 264/50; 264/51; 264/54; 264/321
(58) Field of Search .......................... 264/51, 53, 54, 264/321, 45.5, 50

(56) References Cited

U.S. PATENT DOCUMENTS 3,202,998 A * 8/1965 Hoffman .................... 264/321
3,873,654 A * 3/1975 Smith .................... 264/46.5
3,879,245 A * 4/1975 Fetherston et al. .......... 264/321
3,917,773 A * 11/1975 Gates, Jr. et al. .......... 264/44
4,218,683 A * 8/1980 Hemming .................. 343/703
4,661,820 A * 4/1987 Pouit et al. ................ 342/351
5,560,877 A * 10/1996 Yung et al. ................ 264/321

FOREIGN PATENT DOCUMENTS

| | | | |
|---|---|---|---|
| JP | 408577 | 5/1940 | |
| JP | 58 12729 | * 1/1983 | ................ 264/45.5 |
| JP | 58201621 | * 11/1983 | ................ 264/45.5 |
| JP | 62227728 | * 10/1987 | ................ 264/45.5 |
| JP | 2043260 | 2/1990 | |
| JP | 3104402 | 5/1991 | |
| JP | 479403 | 3/1992 | |
| JP | 4326605 | 11/1992 | |
| JP | 6114956 | * 4/1994 | ................ 264/321 |
| JP | 8186434 | 7/1996 | |
| WO | WO 01422 | * 4/1982 | ................ 264/45.5 |

* cited by examiner

*Primary Examiner*—Allan R. Kuhns
(74) *Attorney, Agent, or Firm*—Ostrolenk, Faber, Gerb & Soffen, LLP

(57) ABSTRACT

A dielectric lens which is produced by injection molding of an expandable material consisting of a synthetic resin, a foaming agent and a dielectric constant conditioner. The expandable material is injected into a cavity of a foaming mold up to at least about 80 percent by weight and at least about 100 percent by volume of the capacity of the cavity and is foamed at an expansion ratio of not more than about 1.3. During the foam molding, the surface of the foam-molded body is solidified to be a radome layer. Then, the foam-molded body is transferred from the foaming mold to a shaping mold, in which the foam-molded is cooled down naturally. Further, a fitting tab is provided integrally with the foam-molded body at the edge of the radome layer.

15 Claims, 3 Drawing Sheets

METHOD OF MANUFACTURING A DIELECTRIC LENS FOR AN ANTENNA

This is a division of application Ser. No. 08/268,221, filed Jun. 29, 1994, now abandoned.

BACKGROUND OF THE INVENTION

1. Field of the Invention

The present invention relates to a dielectric lens and a manufacturing process thereof, and more particularly to a dielectric lens used as an element of an antenna for receiving microwaves for communication and broadcasting and a manufacturing process thereof.

2. Description of Prior Art

A conventional dielectric lens used as an element of an antenna for receiving microwaves of 5 GHz or more is conventionally made of a resin, for example, polypropylene, polyethylene, polystyrene or the like. Ceramic powder, which acts as a foaming agent and as a dielectric constant conditioner is added, and the resin is foamed and molded into a dome. Such a conventional dielectric lens is generally produced by injection molding. However, in producing a thick product by ordinary injection molding, there occur a sink mark on the surface and a lot of voids inside.

Therefore, injection compression molding and structural foaming are recently suggested. Even a thick product produced by injection compression molding does not have defects such as a sink mark and a void, and additionally the entire product can obtain a substantially fixed dielectric constant.

However, injection compression molding requires a mold of a complicated structure and an exclusive molding machine, and thus, the facilities are costly. The structural foaming solves the problem of a sink mark and a void. However, a product produced by structural foaming varies in the expansion ratio and in the dielectric constant from portion to portion, and further, a swirl mark on the surface is caused by bubbles.

In the foaming and molding of the conventional dielectric lens, the surface is solidified to be a radome layer. The radome layer protects the inner foamy body from weathering and reinforces the foamy body. However, if the molded lens is taken out of the mold before the radome layer is formed sufficiently thick, the radome layer will be deflected by the expanding force of the foamy body. On the other hand, if the mold is cooled too suddenly or if the mold cooling time is too long, the radome layer will be formed too thick, which lowers the characteristics as a lens. Further, the long mold cooling time lengthens a molding cycle and lowers the production efficiency.

Further, in order to fabricate the dielectric lens as an element of an antenna, the dielectric lens must be provided with a fitting tab which is to engage with a bracket. Conventionally, insert molding and sandwich molding are used for providing the fitting tab. The insert molding is carried out as follows: a fitting tab, which is made of a high strength resin or a metal, is inserted into a mold; an expandable material is injected into the mold; and thus, on completion of the molding, the fitting tab is fixed on the molded article (dielectric lens). In this method, however, a step of making the fitting tab and a step of inserting the fitting tab into the mold are necessary, which requires more cost and time. In the sandwich molding, a radome layer and a foamy body are made of different resins. The sandwich molding is carried out as follows: a radome layer and a fitting tab are integrally made of a high strength resin by injection molding; and an expandable material is injected into the molded article (radome layer) and becomes a foamy body therein. This method, however, requires two injection cylinders and two kinds of materials.

SUMMARY OF THE INVENTION

An object of the present invention is to provide a manufacturing process of a dielectric lens which has no sink marks and no swirl marks on the surface and no voids inside and whose electrical characteristics, such as dielectric constant and Q, are fixed entirely, the manufacturing process requiring a mold of a comparatively simple structure and a low cost.

Another object of the present invention is to provide a manufacturing process of a dielectric lens wherein a radome layer with a desired thickness can be formed without deflection and the molding cycle is short.

A further object of the present invention is to provide a dielectric lens which is provided with a fitting tab by a simple process, the dielectric lens and the fitting tab being made of the same material.

In order to attain the objects above, a dielectric lens manufacturing method according to the present invention has a foam molding step in which an expandable material which is a synthetic resin containing a foaming agent is injected in a cavity of a foaming mold and a pressure is applied, and in the foam molding step, the expandable material is injected up to at least about 80 percent by weight and at least about 100 percent by volume of the capacity of the cavity and is foamed at an expansion ratio of not more than about 1.3.

Any synthetic resin can be used, as long as it can bring out a dielectric constant sufficiently high to serve as a dielectric lens and is proper for injection foam molding. For example, polypropylene, polyethylene, polystyrene, polybutylene terephthalate, ABS resin and the like can be used. It is also possible to use a mixture of such a synthetic resin and dielectric ceramics, glass fiber or the like. As the foaming agent, a conventional agent, such as carbon dioxide azodicalvonamide, p, p-oxibenzenesulfonic hydrazide, or the like can be used. Because of the foaming agent, the material injected in the mold has a force against the pressure applied from outside, and accordingly, superficial defects (sink marks and swirl marks) and internal defects (voids) of the molded body can be prevented. The mixing ratio of the foaming agent depends on the desired density of the dielectric lens. However, generally, the foaming agent is added at a ratio within a range from about 0.05 to 3.0 percent by weight of the synthetic resin. If the mixing ratio of the foaming agent is less than about 0.05 percent by weight, the effect of preventing defects will not be sufficiently brought out. If the mixing ratio of the foaming agent is more than about 3.0 percent by weight, although a pressure is applied from outside, the expansion ratio will be over 1.3, and in this case, the molded dielectric lens will be poor in the inductivity and other electric characteristics.

As mentioned, a pressure is applied from outside during the foam molding. The expansion of the material by the foaming agent contained therein is inhibited by the pressure, and thereby, a dense body can be made.

In the method, the expandable material is injected up to at least about 80 percent by weight and at least about 100 percent by volume of the capacity of the cavity. Preferably, the expandable material is injected up to a percent within a range from about 85 to 91 percent by weight of the capacity of the cavity. If the expandable material is injected in an amount over 91 percent by weight of the capacity, a burr occurs, and a defective product will be made. If the expandable material is injected up to a percent less than about 85 percent by weight of the capacity, the molded body will be too low in the dielectric constant to have a sufficient antenna gain. The expandable material is foamed at an expansion ratio of not more than about 1.3. Preferably, the expansion ratio is within a range from about 1.00 to 1.17. If the expansion ratio is over 1.17, the molded body is likely to be too low in the dielectric constant to have a sufficient antenna gain. If the expansion ratio is less than 1.0, the molded body is likely to have superficial defects and internal defects.

Weight and volume are interrelated. Thus, the amount of material which fills the capacity (volume) of the cavity can be calculated by multiplying the volume of the cavity by the specific gravity and the result is, of course, expressed in terms of weight. The weight of material injected is preferably less than the weight which would fill the cavity if the expandable material was under ambient pressure.

Another dielectric manufacturing method according to the present invention has a foam-molding step in which an expandable material whose main constituent is a synthetic resin is injected into a cavity of a foaming mold to obtain a dome body with a thin radome layer on the surface, and a shaping step in which the foam-molded body is taken out of the foaming mold and placed in a cavity of a shaping mold which is identical in shape with the foam-molded body. The expandable material, which is in a melted state, is injected into the cavity of the foaming mold and immediately starts foaming, and a radome layer is formed on the surface. When the radome layer becomes lightly solid, the foam-molded body is transferred from the foaming mold to the shaping mold.

In the method, since the foam-molded body is taken out of the foaming mold while the solidification of the radome layer is still light, the foam-molding cycle takes only a short time, and the foaming mold can be used efficiently. The foam-molded body still continues foaming in the shaping mold. However, since the foam-molded body is provided with a proper pressure inside the cavity of the shaping mold, the foam-molded body is not deflected. Also, the radome layer does not grow in the shaping mold any more, and the radome layer is completely solidified to be about 10 mm or less in thickness, which will never degrade the characteristics as a lens.

A dielectric lens according to the present invention is produced as a dome with a radome layer on the surface by injection foam molding of an expandable material whose main constituent is a synthetic resin, and has a fitting tab which is integral with the radome layer and extends outward from the radome layer. The expandable material, which is in a melted state, is injected into a cavity of a mold and immediately starts foaming, and a radome layer is formed on the surface. The cavity of the mold has a recess, and the expandable material deposited in the recess is solidified to be the fitting tab. In this method, a fitting tab can be formed to extend from the radome layer simultaneously with the molding of the dielectric lens. In this method, a fitting tab producing step and an insert molding step can be eliminated. Also, it is not necessary to use two kinds of materials for molding. Thus, a dielectric lens with a fitting tab can be produced in a simple process at a low cost.

BRIEF DESCRIPTION OF THE DRAWINGS

These and other objects and features of the present invention will be apparent from the following description with reference to the accompanying drawings, in which.

DETAILED DESCRIPTION OF THE PREFERRED EMBODIMENTS

Preferred embodiments of the present invention are hereinafter described with reference to the accompanying drawings.

First Embodiment

First, an expandable material was prepared by mixing a synthetic resin, glass fiber and a foaming agent. As the synthetic resin, polypropylene (FR-PP, grade K7000 manufactured by Mitsui Petrochemical Co., Ltd.) was mixed at a mixing ratio by weight of 100. The glass fiber was added at a mixing ratio by weight of 10, and as the foaming agent, azo-dicalvonamide (Polyvan 206 manufactured by Mitsubishi Petrochemical Co., Ltd.) was added at a mixing ratio by weight of 0.5. For including the foaming agent with the synthetic resin, any proper method, for example, a masterbatch method, a compound method or the like, can be adopted.

The expandable material was injected into a cavity between an upper segment 31 and a lower segment 32 of a mold in the following condition.

temperature of upper segment: 20° C.

temperature of lower segment: 60° C.

pressure of injection: 1448 kg/cm$^2$ speed of injection: 114 cm$^3$/sec

Then, a pressure was applied to the mold in the following condition, and the expandable material was foamed.

pressure applied: 434.4 kg/cm$^2$ pressure applying time: 20 seconds cooling time after application of pressure:
540 seconds The expandable material was injected into the cavity up to 87.2 percent by weight of the capacity of the cavity. That is, the weight of the injected expandable material was 87.2% of the theoretical limit weight which is figured out by multiplying the volume of the cavity by the specific gravity of the expandable material. The volume of the injected expandable material was equal to or more than the volume of the cavity. More specifically, the volume of the cavity was 2702.4 cm$^3$, and the volume of the injected material was 2763.2 cm$^3$. Thus, the volume of injected material was slightly more than the volume of the cavity (about 2% more) and this volume was injected into the cavity at a pressure of 1448/kg/cm$^2$.

Figure 1:
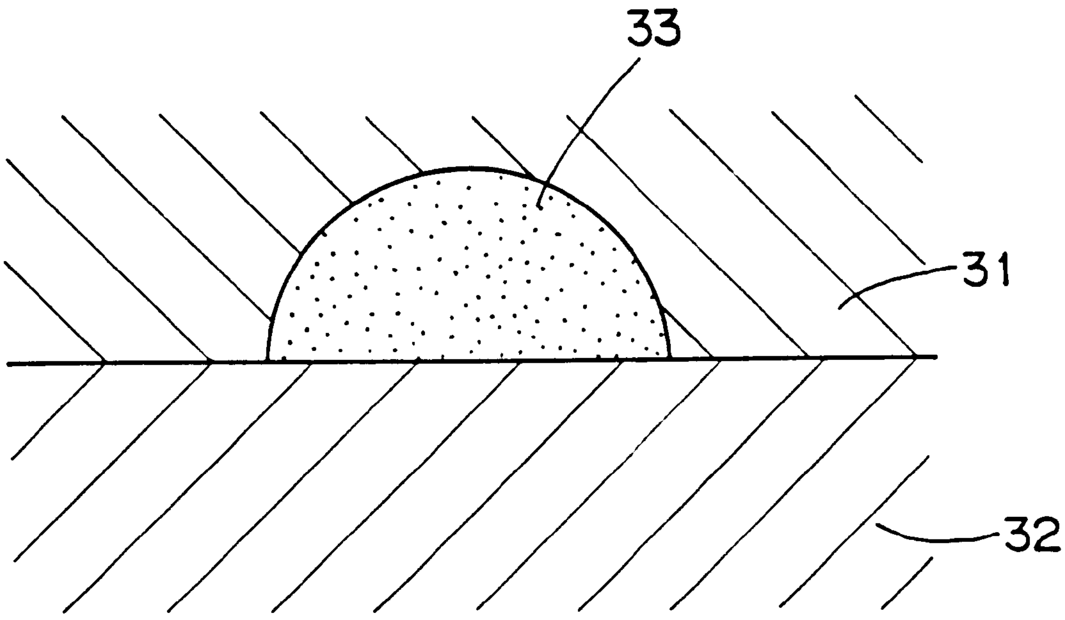
FIG. 1 is a sectional view of a dielectric lens which is a first embodiment of the present invention, explaining a foam-molding step.
Figure 2:
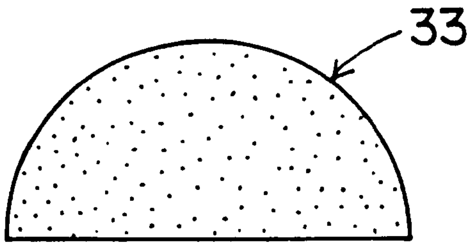
FIG. 2 is a sectional view of the dielectric lens produced through the step shown in FIG. 1.

FIG. 2 shows a dielectric lens 33 produced by the above-described method. The dielectric lens 33 had no sink marks and no swirl marks on the surface and no voids inside. The dielectric constants of various portions of the dielectric lens 33 were measured, and as a result, it was confirmed that the dielectric lens 33 had a substantially fixed dielectric constant in every portion.

The following Table shows the antenna gains (dB) of dielectric lenses which were produced in the above-described condition at various expansion ratios. Judging from the antenna gain, sample numbers 1 through 4 are inferior. Therefore, in the above method, the expansion ratio should be set about 1.17 or less.

TABLE 1

| Sample Number | Expansion Ratio | Weight after Molding (g) | Antenna Gain (dB) 1.12620 GHz | Antenna Gain (dB) 1.16456 GHz | Antenna Gain (dB) 1.24128 GHz |
|---|---|---|---|---|---|
| 1 | 1.200 | 1809 | 27.4 | 27.4 | 27.9 |
| 2 | 1.196 | 1814 | 27.4 | 27.5 | 27.9 |
| 3 | 1.186 | 1830 | 27.7 | 27.6 | 27.9 |
| 4 | 1.174 | 1849 | 27.8 | 27.7 | 27.9 |
| 5 | 1.159 | 1873 | 28.1 | 27.8 | 28.0 |
| 6 | 1.154 | 1880 | 28.1 | 27.8 | 28.1 |
| 7 | 1.150 | 1887 | 28.0 | 27.8 | 28.0 |
| 8 | 1.138 | 1908 | 28.1 | 28.0 | 28.1 |
| 9 | 1.110 | 2140 | 28.1 | 28.2 | 28.3 |

Second Embodiment

Figure 3:
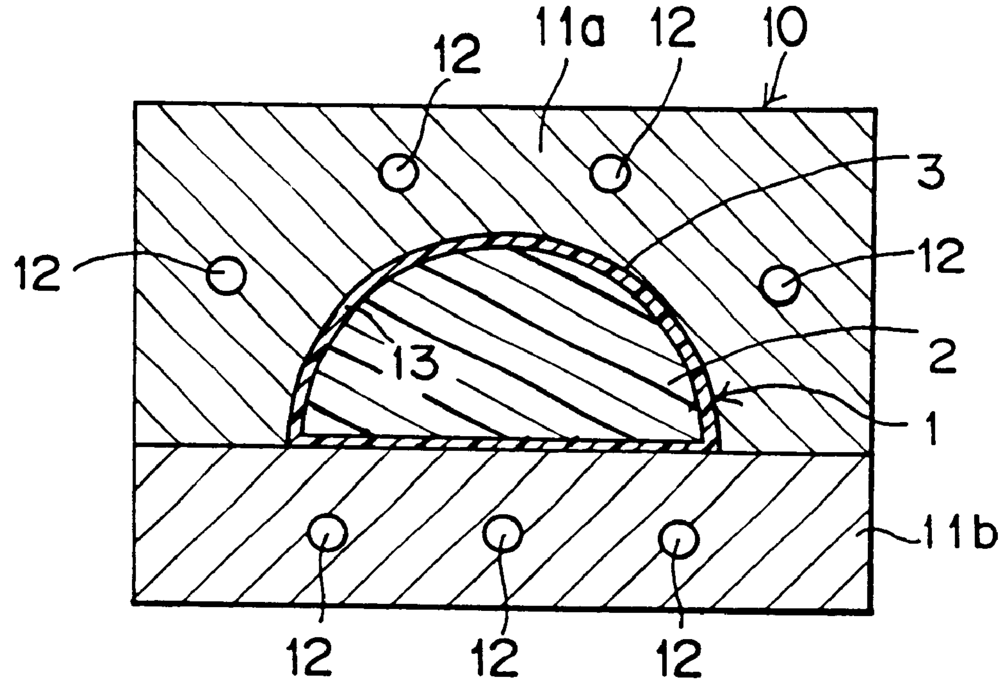
FIG. 3 is a sectional view of a dielectric lens, explaining a foam-molding step of a method which is a second embodiment of the present invention.
Figure 4:
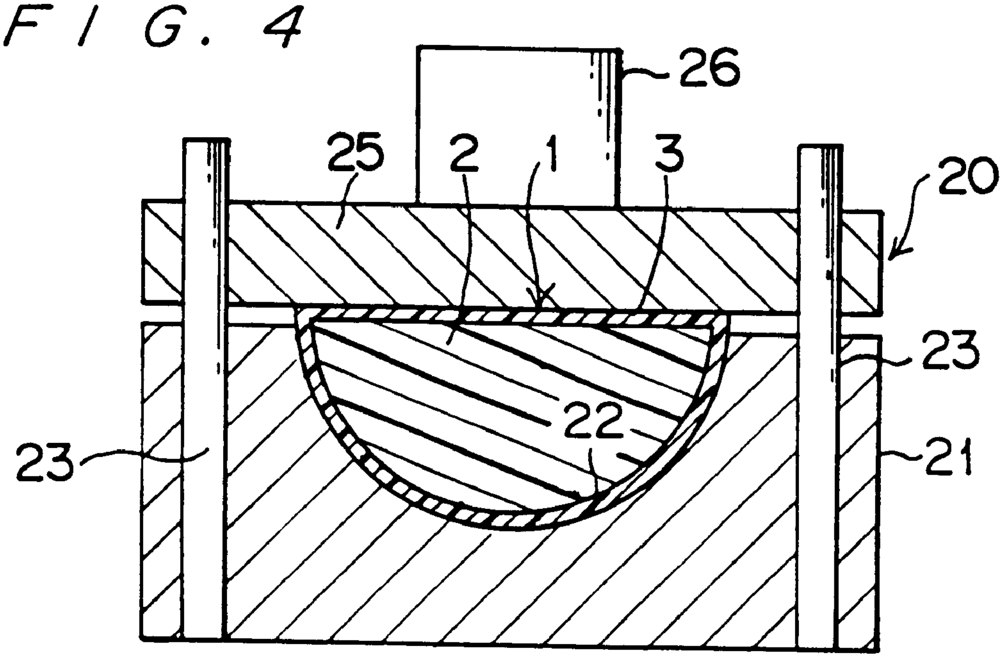
FIG. 4 is a sectional view of a dielectric lens, explaining a shaping step of the method of the second embodiment.

A method of the second embodiment has a foaming step shown by FIG. 3 and a shaping step shown by FIG. 4.

An expandable material was prepared by mixing a resin with a foaming agent. As the resin, polypropylene was mixed at a mixing ratio by weight of 98, and as the foaming agent, azo-dicalvonamide was mixed at a mixing ratio by weight of 2. Further, $CaTiO_3$ which acts as a dielectric constant conditioner was added. The expandable material was injected from a cylinder into a cavity 13 of a foaming mold 10. As the dielectric constant conditioner, $BaTiO_3$, $MgTiO_3$ or the like can be used as well as $CaTiO_3$.

The foaming mold 10 consists of a fixed upper segment 11*a* and a movable lower segment 11*b*. These segments 11*a* and 11*b* are made of a metal with a high coefficient of thermal conductivity, such as copper, iron or the like, and has temperature regulation holes 12 through which a coolant circulates. The cavity 13 is a dome with a radius of 90 mm, and a foam-molded body 1 thereby will be that shape. The injection foam molding was carried out under the following condition.

temperature of cylinder: 220° C.

temperature of mold: 80° C.

pressure of injection: 1448 $kg/cm^2$ speed of injection: 114 $cm^3/sec$ pressure applied: 434.4 $kg/cm^2$ cooling time: 180 seconds After the injection of the expandable material, the mold was kept at a temperature of 80° C. for the cooling time. During the cooling time, the injected material was foamed and was lightly solidified on the surface, and thus, a radome layer 3 was formed on the surface of a foamy body 2. After the cooling time, the foam-molded body 1 was taken out of the foaming mold 10 and transferred to the shaping step.

A shaping mold 20 consists of a main segment 21 with a cavity 22, and a movable plate 25 which is movable up and down along guide poles 23. The movable plate 25 is provided with a specified pressure by a cylinder 26 and presses the foam-molded body 1 placed in the cavity 22. The cavity 22 is identical in shape with the foam-molded body 1. The main segment 21 and the movable plate 25 are made of a material with a low coefficient of thermal conductivity, such as a compact of wooden flour with ABS resin or ceramics. ABS resin has a coefficient of thermal conductivity of $5\times10^{-4}$cal/cm·S·° C. Alumina, which is a typical kind of ceramics, has a coefficient of thermal conductivity of $4\times10^{-3}$cal/cm·S·° C. Also, the main segment 21 and the movable plate 25 can be made of a metal, but in that case, a temperature regulating system is necessary.

The foam-molded body 1 taken out of the foaming mold 10 was placed in the shaping mold 20 immediately. In the shaping mold 20, a pressure of 5.75 $kg/cm^2$ was applied to the foam-molded body 1 by the movable plate 25, and the foam-molded body 1 was kept under the pressure for one hour. In the meantime, the foam-molded body 1 was cooled down naturally. Although the foamy body 2 still continued foaming, the radome layer 3 was regulated by the shaping mold 20 and was solidified without deflection. The solidification of the radome layer 3 was completed in the shaping mold 20. Because the foam-molded body 1 was naturally cooled down in the shaping mold 20 and because the material of the shaping mold 20 has a low coefficient of thermal conductivity (lower than the coefficient of thermal conductivity of the material of the foaming mold 10), the radome layer 3 did not become thick.

A dielectric lens produced in this way had an expasion ratio of 1.15, and a dielectric constant of 2.1. The thickness of the radome layer 3 was 5 mm, and the accuracy in the shaping as a dome was +/−0.5 mm or less. The dielectric lens had no sink marks, no swirl marks and no voids.

Figure 5:
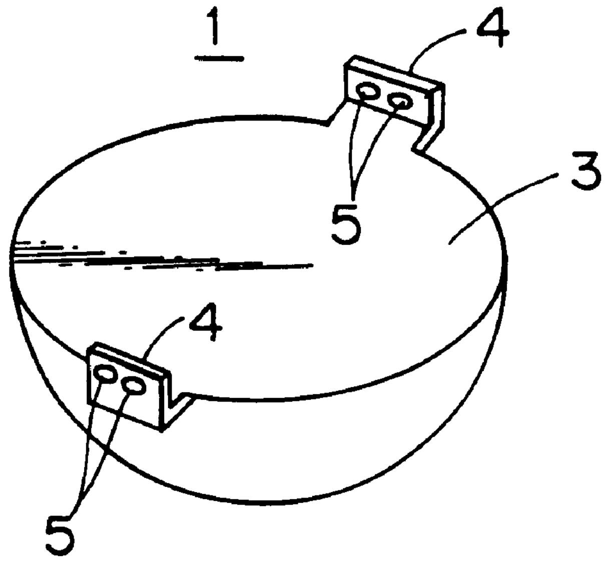
FIG. 5 is a perspective view of a dielectric lens produced by the method of the second embodiment.
Figure 6:
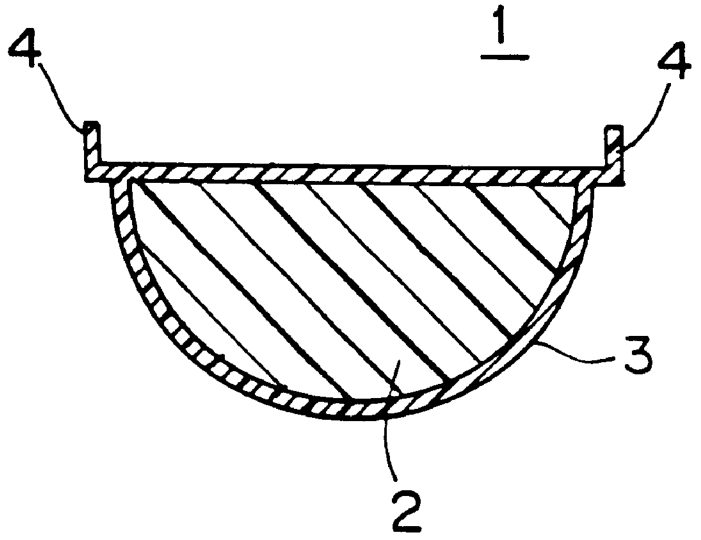
FIG. 6 is a sectional view of the dielectric lens shown in FIG. 5.

Now referring to FIGS. 5 and 6, a modification of the second embodiment is described. A dielectric lens 1 was produced basically in the above-described method of the second embodiment. The dielectric lens 1 has a foamy body 2 inside, a radome layer 3 on the surface and further fitting tabs 4 on the circumference. The fitting tabs 4 were provided to the dielectric lens 1 by integral molding.

In this case, the cavity of the mold has recesses for forming the fitting tabs 4. The expandable material flew into the recesses, and the material in these recesses was solidified to be fitting tabs 4 simultaneously with the solidification of the radome layer 3. After the molding and the cooling, holes 5 were made in the fitting tabs 4 by drilling.

In such a case of providing fitting tabs 4, the shaping step can be eliminated. In a method without the shaping step, as long as the same expandable material and the same type of foaming mold as in the second embodiment are used, the following molding condition is proper.

temperature of cylinder: 230° C.

temperature of mold: 60° C.

pressure of injection: 1448 $kg/cm^2$ speed of injection: 114$cm^3$/second pressure applied: 434.4 $kg/cm^2$ The mold is made of a metal with a high coefficient of thermal conductivity, such as copper, iron or the like, and the mold is kept at a temperature of 60° C. by a coolant circulating therein. After injection of the expandable material, when a time proper for obtaining a desired state of foaming of the foamy body 2 and of solidification of the radome layer 3, for example, 90seconds has passed, the molded body (dielectric lens 1) is taken out of the mold. Then, the molded body is cooled down in the air.

The growth of the radome 3 depends on the temperature of the cavity of the mold and the cooling time after injection. Under the above condition, the radome 3 grows to be 5 mm in thickness. In the point of the characteristics as a lens, the thickness of the radome 3 is preferably 10 mm or less. In order to obtain a desirably grown and sufficiently firm radome 3 and sufficiently firm fitting tabs 4, further considering shortening of time, the mold is preferably kept at a temperature within a range from about 50 to 70° C. for about 80 to 100 seconds. After the dielectric lens 1 is taken out of the mold, the foamy body 2 still continues foaming a little. However, since the radome 3 is almost solidified, the dielectric lens 1 will never be deflected by the expanding force.

Although the present invention has been described in connection with the preferred embodiments above, it is to be noted that various changes and modifications are possible to those who are skilled in the art. Such changes and modifications are to be understood as being within the scope of the present invention.

What is claimed is:

1. A method of producing a dielectric lens for an antenna, the method comprising:

a foam-molding step in which an expandable material which is a synthetic resin containing a foaming agent is injected into a cavity of a mold and is provided with a pressure, the weight of the expandable material being injected within a range of about 85 to 91 percent of a theoretical limit weight which is determined by multiplying a volume of the cavity by a specific gravity of the expandable material, and the volume of the expandable material being at least about 100 percent of a capacity of the cavity, and the expandable material being foamed at an expansion ratio of not more than about 1.3.

2. A method of producing a dielectric lens for an antenna as claimed in claim 1, wherein the foaming agent is contained in the synthetic resin in a mixing ratio of about 0.05–3.0 percent by weight of the synthetic resin.

3. A method of producing a dielectric lens for an antenna as claimed in claim 1, wherein the expandable material is foamed at an expansion ratio within a range from about 1.00 to about 1.17.

4. A method of producing a dielectric lens for an antenna as claimed in claim 1, wherein the synthetic resin is selected from the group consisting of polypropylene, polyethylene, polystyrene, polybutylene terephthalate and ABS resin.

5. A method of producing a dielectric lens for an antenna as claimed in claim 1, wherein the foaming agent is selected from the group consisting of carbon dioxide, azodicalvonamide and p,p-oxibenzenesulfonic hydrazide.

6. A method of producing a dielectric lens for an antenna as claimed in claim 1, wherein the expandable material further contains a dielectric constant conditioner.

7. A method of producing a dielectric lens for an antenna as claimed in claim 5, wherein the foaming agent is contained in the synthetic resin in a mixing ratio of about 0.05–3.0 percent by weight of the synthetic resin.

8. A method of producing a dielectric lens for an antenna, the method comprising:

a foam-molding step in which an expandable material whose main constituent is a synthetic resin is injected into a cavity of a foaming mold to obtain a dome body with a thin radome layer on a surface; and a shaping step in which the foam-molded body is transferred from the foaming mold into a cavity of a shaping mold, the cavity of the shaping mold being identical in shape with the foam-molded body.

9. A method of producing a dielectric lens for an antenna as claimed in claim 8, wherein the synthetic resin is selected from the group consisting of polypropylene, polyethylene, polystyrene, polybutylene terephthalate and ABS resin.

10. A method of producing a dielectric lens for an antenna as claimed in claim 8, wherein the foaming agent is selected from the group consisting of carbon dioxide, azodicalvonamide and p,p-oxibenzenesulfonic hydrazide.

11. A method of producing a dielectric lens for an antenna as claimed in claim 10, wherein the foaming agent is contained in the synthetic resin in a mixing ratio of about 0.05–3.0 percent by weight of the synthetic resin.

12. A method of producing a dielectric lens for an antenna as claimed in claim 8, wherein the expandable material further contains a dielectric constant conditioner.

13. A method of producing a dielectric lens for an antenna as claimed in claim 8, wherein the foaming agent is contained in the synthetic resin in a mixing ratio of about 0.05–3.0 percent by weight of the synthetic resin.

14. A method of producing a dielectric lens for an antenna as claimed in claim 8, wherein said radome layer is up to about 10 mm in thickness.

15. A method of producing a dielectric lens for an antenna as claimed in claim 8, wherein the expandable material is foamed at an expansion ratio within a range from about 1.00 to about 1.17.

* * * * *